UNITED STATES PATENT OFFICE.

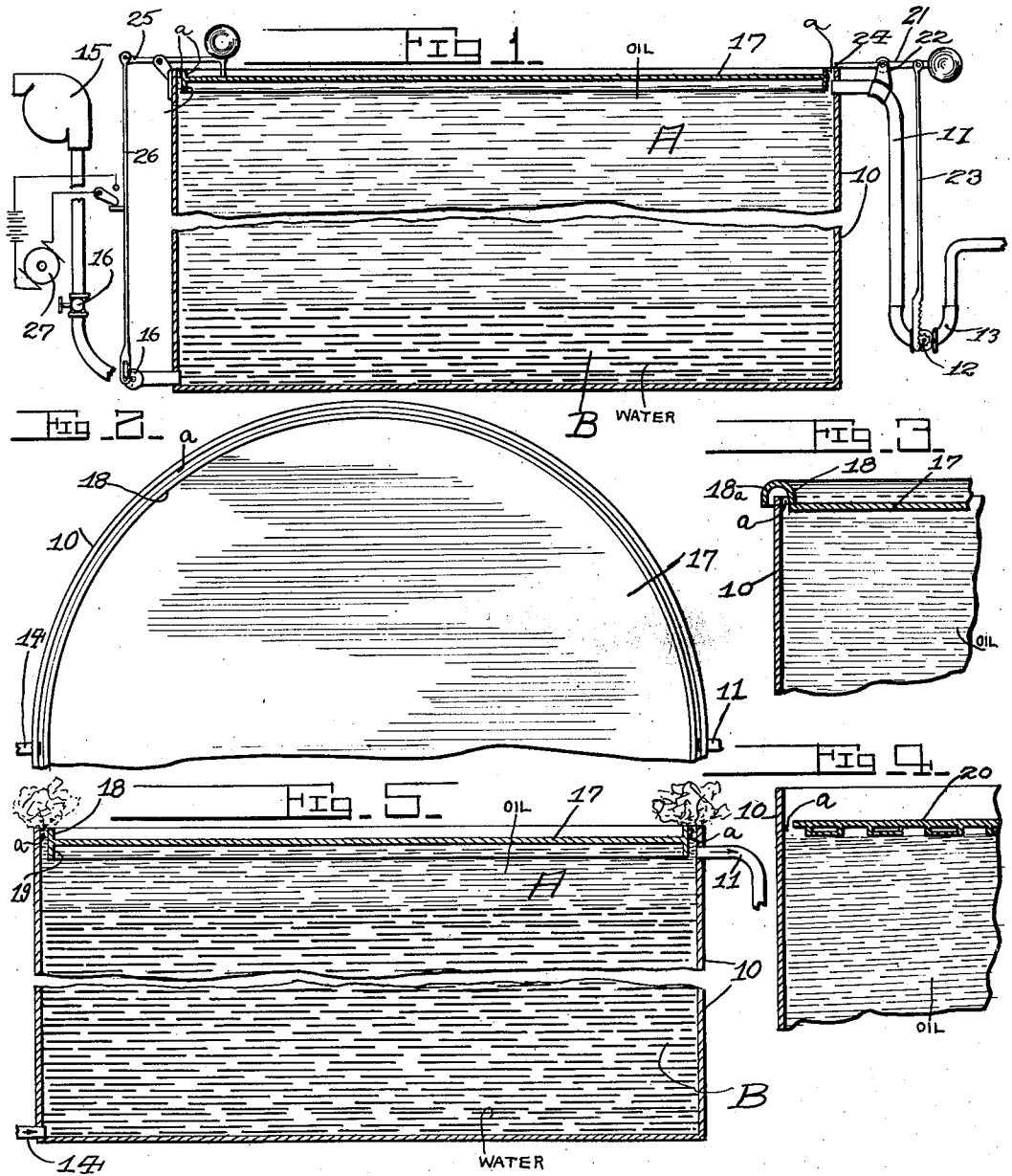

ROBERT E. JOHNSTON, OF CONGO, WEST VIRGINIA.

MEANS FOR PREVENTING OIL-TANK FIRES.

1,417,605.  Specification of Letters Patent.  Patented May 30, 1922.

Application filed November 13, 1920. Serial No. 423,919.

*To all whom it may concern:*

Be it known that I, ROBERT E. JOHNSTON, a citizen of the United States, residing at Congo, in the county of Hancock and State of West Virginia, have invented certain new and useful Improvements in Means for Preventing Oil-Tank Fires, of which the following is a specification, reference being had to the accompanying drawings.

This invention relates to oil tanks, particularly tanks of a very large size ordinarily used for storing oil in the oil fields and at other places, and particularly to means for minimizing the chance of the oil becoming ignited and reducing the damage due to the ignition of the oil.

Oil tank fires are quite numerous and entail a very large loss not only of the oil contained in the tank but as to the tank itself, and may entail the ignition of tanks adjacent the tank initially set on fire. These oil tank fires may occur from a variety of causes, one of which is due to the tank being struck by lightning, and the gas or vapor within the upper portion of the tank being ignited. Various means have been suggested to prevent these oil tank fires. None of these, as far as I know, are in practical use, and when an oil tank catches on fire for any reason it is usually allowed to burn. This, of course, ruins the tank, the intense heat so damaging the tank as to make it unfit for any further service. In many fields cannon are disposed adjacent the oil tank so that if a tank catches fire a projectile may be fired into the tank to release the oil therein.

The general object of my invention is to provide in the first place a simple means whereby the oil within the tank may be forced out of the tank while the oil at the surface of the tank is burning, and whereby the fire will be prevented from burning downward within the tank, and whereby the tank may be cooled until the fire is put out by lack of oil.

And a further object is to so construct the tank that there is no gas space or chamber above the liquid in the tank which will contain inflammable explosive gas or vapor, and yet so form the tank as to prevent rapid evaporation of its contents or prevent the oil from being contaminated.

A further object is to confine the space wherein ignition of the oil can possibly occur to a very small space around the margin of the tank.

A further object is to so form the tank that the oil will be protected and the collection of gas or vapor prevented whether the oil be low in the tank or high in the tank, and whereby the oil, if desired, may be kept at a constant level in the tank without regard to the depth of the oil.

Other objects will appear in the course of the following description.

My invention is illustrated in the accompanying drawings, wherein:—

Figure 1 is a sectional view of an oil tank with my improvements applied thereto;

Figure 2 is a fragmentary top plan view of the tank shown in Figure 1;

Figure 3 is a fragmentary vertical sectional view showing a modification of the cover;

Figure 4 is a like view to Figure 3, but showing another modification in the form of the cover;

Figure 5 is a view showing the manner in which the oil is discharged when for any reason the tank is set on fire.

Referring to these drawings, 10 designates an oil tank. I have illustrated this oil tank conventionally, but it may be of any shape or capacity and constructed in any suitable manner, my invention not relating to the details of construction or the shape of the tank. The large oil tanks to which my invention is particularly applicable oftentimes have a diameter of 100′ with a height of 30′.

Extending from the upper portion of the oil tank and preferably adjacent the upper edge thereof is an oil pipe 11 which may be connected with the oil piping main or with another tank, or with any means whereby oil may be delivered into the tank 10 or discharged therefrom. I have illustrated this oil pipe 11 as being provided with a valve 12, although this illustration is purely conventional. I have also illustrated this pipe as formed with a trap 13 of conventional form.

Entering the bottom of the oil tank is a water pipe 14 of any suitable size which extends to a source of water under pressure. Thus the pipe 14 may extend to a pump 15, conventionally shown in Figure 1, which in turn is connected to a source of water, or the pipe 14 may be connected to a source of water at a higher level than the tank 10.

It is sufficient that the pipe 14 be connected to any means whereby water may be caused to enter the tank and fill it when desired.

I have illustrated the pipe 14 as being provided with a conventional valve 16. This valve and the valve 12, for instance, may be located at any desired distance from the oil tank.

Resting on the oil A in the tank 10 and floating upon this oil is a disk or cover 17 of sheet metal. This disk has an area nearly that of the tank so that when it is disposed within the tank, this disk will move freely up and down and there shall be a very small space $a$ between the margin or edge of the disk and the wall of the tank. This space is just sufficient to permit free movement of the disk or cover. The disk, in order that it may float, will either have its margins extended upward, as at 18, or extended downward, as at 19, or both as illustrated, in Figure 1, that is the margin of the disk 17 is shown as being formed with an upwardly extending flange 18 and a downwardly extending flange 19. In the first instance the disk 17 will obviously float upon the oil because of its upwardly extending margin, and where the margin is extended downward, a small amount of air or gas will collect between the surface of the oil A and the inner face of the disk 17 which will cause the disk to float. I may provide this disk 17 with air compartments 20, as shown in Figure 4, in order to render this cover buoyant. In any case, this cover 17 is buoyant and floats upon the upper surface of the oil and moves freely with the oil. A small amount of water B, as for instance water to the depth of 6" or a foot, is allowed to remain in the bottom of the tank 10 and the oil, which is of course lighter than the water, rests upon this layer of water and fills the tank.

Now if it be desired to discharge the oil from the tank, it is done by allowing water to flow through the pipe 14 into the tank, which water will gradually force the oil upward and the oil will pass out through the pipe 11, the valve 12 being of course open for this purpose. The discharge capacity of the pipe 11 should be, of course, the same as the inlet capacity of pipe 14 or even greater than this inlet capacity so that no oil will run off over the top of the tank. When the water has filled the tank, the oil has, of course, been discharged. If it is again desired to fill the tank with oil, the water is pumped or run off from the tank and oil is correspondingly allowed to flow into the tank through the pipe 11. In either case, of course, the cover 17 will maintain its position at the upper end of the tank as the volume of liquid within the tank will be the same at all times, the only difference being that in the first instance it is almost all oil with a layer of water at the bottom and in the second instance it is almost all water with a layer of oil on top.

Now it will be obvious from the drawing that no gas can collect in the upper portion of the tank unless the cover 17 is formed with a downwardly depending flange 19, in which case a small amount of gas may collect under this lid or cover 17. If the lid or cover, however, is formed merely with the upwardly extending flanges 18, it is obvious that no gas can possibly collect. The oil will be subject to evaporation at that portion of the oil which fills the space $a$ but this is very slight. The evaporation will be correspondingly small and this gas will pass directly off into the air without having a chance to collect. If, however, this gas should become ignited in any manner or the oil in the tank ignited in any manner, the oil would merely burn in the space $a$ (see Figure 5) and there would be a slight ring of the burning oil around the margin of the cover 17. Under these circumstances and in order to stop the conflagration, water would be allowed to enter the lower portion of the tank by the pipe 14 and the oil would be drawn off at the same rate through the pipe 11, and as soon as the water had filled the tank the fire would be, of course, stopped for lack of fuel. Furthermore, as the oil is discharged and water enters, the tank is kept cool and the cooled portion of the tank continually increases upward so that the fire would have no effect upon the tank itself. The amount of damage done by the very small annular flame burning in the space $a$ would be very little during the time that the oil in the tank was being carried off through the pipe 11 and the water is entering through the pipe 14, and even if no oil was carried off the amount of damage done by the very slight burning of the oil would amount to very little except for the loss of the oil.

I do not wish to be limited to a construction wherein the valves 12 and 16 are automatically operated, but in Figure 1 I have illustrated diagrammatically a construction wherein the valve 12 may be opened to permit the outflow of oil and the valve 16 may be opened to admit the inflow of water, in case the tank is set on fire. The valve 12 is operated by a lever 21 which may be weighted at one end, and mounted upon a bracket 22 and connected to the valve 12 by means of a chain, rod or other suitable connection 23. One end of this lever 21 is provided with a fusible connection 24 to the tank of such a character that if the contents of the tank are set on fire between the edge of the disk 17 and the tank wall, the heat will fuse the connection 24, the lever will tilt, and the valve 12 be opened. Assuming that the flow from the pipe 11 is by gravity and that this pipe is connected to a tank on a lower level than the tank 10, it is obvious that the oil will commence to flow off and the disk 17 will sink.

In order to provide for immediately opening the valve 16 and starting the pump 15, I provide a lever 25 which has its free end resting upon the disk 17 and when this disk falls, the free end of the lever falls which, through the connection 26, causes the opening of the valve 16 and at the same time starts up the electrically actuated pump 15, provided a pump is used to force water into the tank. Of course, if the pipe 14 extends to a reservoir on a higher level than the tank 10, there is no necessity of the pump 15 and its electric motor, and in that case the mere opening of the valve 16 will be sufficient to cause the flow of water into the tank 10 to compensate for the withdrawal of oil. It will be understood, of course, that I have illustrated the motor 27 diagrammatically and that this motor is connected in a normally interrupted circuit with a source of electric current and is operatively connected with the pump 15 to drive it, and it will be further understood that my showing is purely and entirely diagrammatic and that a large variety of different mechanisms might be used to cause both the opening of the valve 12 upon the ignition of the tank and the opening of the valve 16.

Of course, it will be obvious that the connection between the lever 25 and the valve 16 should be such that once the valve has been opened upon the initial descent of the disk 17, the valve will stay open until it has been manually closed, and that the pump 15 continues its operation after the disk 17 has returned to its normal position consequent upon the influx of water.

These valves 16 and 12 will, of course, be such that they may be manually opened and closed under ordinary circumstances.

While I have illustrated my invention as applied to oil storage tanks, I wish it to be understood that it may be applied to the tanks of vessels or to the "tankers" themselves. In the case of oil tanks on vessels or the tankers themselves, the fuel as it is used leaves a space at the top of the oil chamber or oil container in which gas can collect. If this gas becomes ignited, the vessel is set on fire. In applying my idea to such tanks or oil storage tanks on vessels, the tank is kept full by allowing water to enter at the bottom of the tank as the oil is taken out, the top of the tank being closed in any suitable manner. There being no collection of gas, the chances of ignition and explosion will be very small.

I am aware that the idea of forcing the oil out by pumping water to the tank has been disclosed in a prior patent to Ralph D. Mershon, No. 744,585, granted on the 17th day of November, 1903, but in this patent no provision is made for localizing the fire to a small space immediately surrounding a vertically movable floating cover, but on the contrary the tank is covered or roofed and explosive gas or vapor will collect in the upper portion of the tank above the oil, even though vanes are provided for permitting the escape of this gas or vapor. Hence if the tank is struck by lightning or the vapor otherwise ignited, the oil will burn over the entire upper surface of the oil, greatly damaging this roof or cover, heating the tank to a degree which will damage it, and causing great loss of oil. This is not possible with my improvement for the reason that, as before explained, there is no place for gas to collect and the flames are restricted to a very small area of the oil.

In Figure 3 I illustrate a slight modification of the floating cover 17, wherein the margin of the cover is not only formed with an upwardly projecting flange 18, but wherein this flange 18 is carried to a point above the upper edge of the wall of the tank and then downward, as at $18^a$. This would prevent any chance of rain water entering the tank from above, but where this flange is used it would be necessary that care be taken that at all times the cover was afloat and resting upon the surface of the oil or the surface of the water. Where the disk-like cover 17 is used without any extension $18^a$, the cover may sink to the bottom of the tank and yet be readily carried upward when water is forced into the tank from below.

I do not wish to be limited to the pipe 14 entering the bottom of the tank, provided this pipe 14 discharges at the bottom of the tank, nor is it necessary that the pipe 11 shall extend from the top of the tank provided it receives oil from the top of the tank.

I claim:—

1. The combination with an oil tank, of a disk-like cover having an area slightly less than the area of the oil tank and floating at all times on the oil tank, an oil pipe leading from the upper portion of the tank, a water pipe discharging at the bottom of the tank, valves in the oil pipe and water pipe, and means automatically opening the valve in the oil pipe upon an ignition of the oil in the tank, and means simultaneously opening the water inlet pipe.

2. The combination with an oil tank, of a disk-like cover having an area slightly less than the area of the oil tank and floating at all times on the oil tank, an oil pipe leading from the upper portion of the tank, a water pipe discharging at the bottom of the tank, valves in the oil pipe and water pipe, means automatically opening the valves in the oil pipe upon an ignition of the oil in the tank, and means for opening the valve in the water inlet pipe including a disk actuated member shifted to a position to open the valve upon a downward movement of the disk.

3. The combination with an oil tank, of a disk-like cover having an area slightly less than the area of the oil tank and floating at all times on the oil therein, an oil outlet pipe discharging from the upper end of the tank, a water inlet pipe discharging adjacent the bottom of the tank, valves in both of said pipes, fusible means operatively connected to the oil outlet valve and opening said valve upon the ignition of the oil between the disk and the wall of the tank, and means for causing the simultaneous opening of the other valve.

In testimony whereof I hereunto affix my signature.

ROBERT E. JOHNSTON.